March 24, 1964 J. H. HOLLYDAY 3,126,083
ELEVATOR
Filed June 11, 1962 2 Sheets-Sheet 1
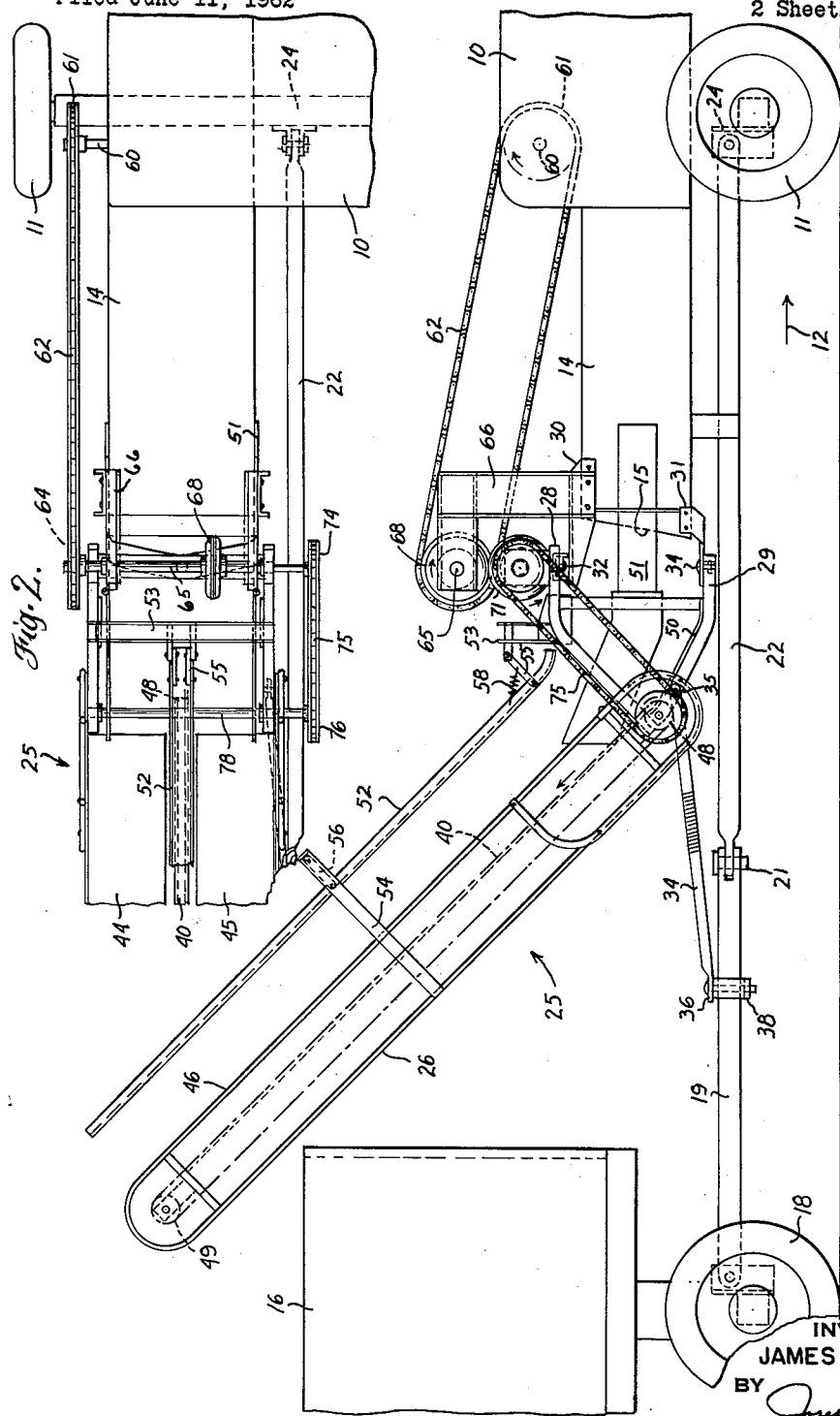
INVENTOR
JAMES H. HOLLYDAY
BY
Joseph A. Brown
ATTORNEY March 24, 1964 — J. H. HOLLYDAY — 3,126,083
ELEVATOR
Filed June 11, 1962 — 2 Sheets-Sheet 2

INVENTOR
JAMES H. HOLLYDAY
BY Joseph A. Brown
ATTORNEY

United States Patent Office 3,126,083
Patented Mar. 24, 1964

3,126,083
ELEVATOR
James H. Hollyday, New Holland, Pa., assignor to Sperry Rand Corporation, New Holland, Pa., a corporation of Delaware
Filed June 11, 1962, Ser. No. 201,634
5 Claims. (Cl. 198—7)

The present invention relates generally to conveying apparatus and more particularly to a bale elevator for a hay baler to receive bales therefrom and to convey them to a trailing wagon.

One object of this invention is to provide a bale elevator adapted to be mounted on the bale case of a hay baler and laterally swingable relative thereto responsive to changes in the direction of travel of the baler so that bales handled by the elevator will be deposited in a trailing wagon regardless of the position of the wagon relative to the baler.

Another object of this invention is to provide a bale elevator of the character described having a drive which is so constructed that the transmission of power to the elevator is disconnected upon lateral swinging of the elevator beyond a predetermined point.

Another object of this invention is to provide a bale elevator of the character described having drive means which is adjustable whereby the point at which the transmission of power will be disconnected on lateral swinging of the elevator may be varied as desired.

A further object of this invention is to provide a bale elevator having drive means providing a transmission of power which is adapted to slip if the elevator becomes subjected to overloading conditions.

A still further object of this invention is to provide a bale elevator of the character described which is of simpler design then previous elevators of prior design whereby the elevator may be manufactured, assembled and repaired at low cost.

Other objects of this invention will be apparent hereinafter from the specification and from the recital in the appended claims.

In the drawings:

FIG. 1 is a fragmentary generally diagrammatic side elevation of a hay baler and a wagon trailing behind the baler, a bale elevator being mounted on the bale case of the baler and constructed according to this invention;

FIG. 2 is a fragmentary plan view of FIG. 1;

Figure 3:
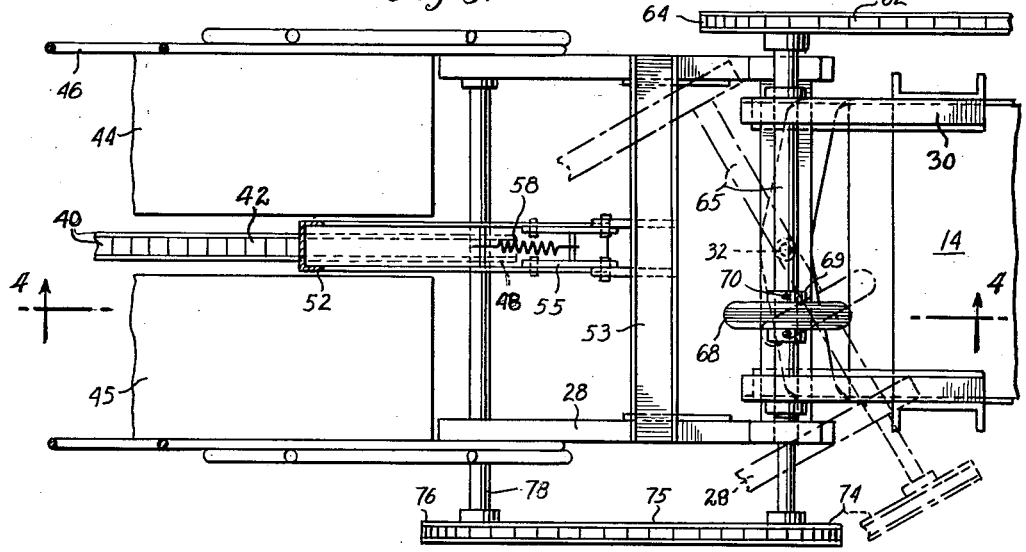
FIG. 3 is a view similar to FIG. 2 but showing the baler drive on an enlarged scale and showing dotted lines the elevator swung laterally.

Referring now to the drawings by numerals of reference, and particularly to FIG. 1, 10 denotes a conventional automatic field hay baler supported on ground wheels 11 for travel in the direction indicated by the arrow 12. The baler has a fore-and-aft extending bale case 14 in which the bales are formed and having a rear end 15 from which successive bales are discharged from the baler. Located behind the baler is a trailing wagon 16 having ground wheels 18 and a forwardly projecting tongue 19. The tongue 19 is connected by a pin 21 to a drawbar 22 connected to the frame 24 of the baler 10. The pin 21 extends vertically and provides a pivotal connection between wagon tongue 19 and baler drawbar 22. As the baler travels across a field, the wagon trails directly behind the baler. However, the baler and wagon become angularly disposed relative to each other when a turn is made and the direction of travel of the baler is changed. In such case, the tongue 19 and drawbar 22 become angularly related to each other.

For receiving bales discharged from the rear end 15 of bale case 14 and for elevating and conveying such bales to the trailing wagon 16, a bale elevator 25 is provided comprising an upwardly and rearwardly extending frame structure 26. At its lower forward end, the frame 26 has frame members 28 and 29 which extend respectively above and below bale case 14 and connected thereto by brackets 30 and 31. The frame members 28 and 29 are connected to brackets 30 and 31 by vertically aligned pivots 32 and 34 whereby the bale elevator is allowed to swing laterally relative to bale case 14. For achieving and controlling such swinging action, lower frame member 29 is connected to the wagon tongue 19 by a link arm 34 having its forward end 35 connected to the elevator frame by transversely extending pivot means and having its rear end 36 connected to the tongue 19 by a straddling bracket 38 which is longitudinally slidable along the tongue responsive to changes in the angular relationship of the tongue and drawbar 22. Elevator 25 is swung laterally during a turn in the same direction as the turn.

Mounted on frame 26 is an endless conveyor 40 comprising a chain having outwardly projecting teeth 41 spaced along the length of the conveyor and operable to engage and thereby convey the bales. The upper reach 42 of the chain travels between a pair of plates 44 and 45 operable to support each bale as it is conveyed upwardly and rearwardly. Side rails 46 are provided and projecting upwardly from the support plates 44 and 45 to guide the bales as they are transported. The lower forward end of endless chain 40 travels around a sprocket 48 and the upper rearward end of the chain travels around a sprocket 49. As shown in FIG. 1, sprocket 49 is located above trailing wagon 16 and when a bale is discharged over the upper rearward end of the elevator, the bale drops into the wagon. Then the bales are manually stacked or, preferably, allowed to pile up at random.

As each bale is discharged from bale case 14 it slides across an upwardly inclined bottom plate 50 which terminates rearwardly at the endless conveyor 40. If elevator 25 is swung laterally from its normal neutral position, extending directly rearwardly of the bale case 14, then guide plates 51 (FIG. 1) projecting rearwardly along opposite sides respectively of the bale case bend and guide each bale as it is discharged and direct it to the elevator. The upper reach 42 of the elevator travels toward sprocket 49 and each bale, such as the bale B in FIG. 4 slides along the support plates 44 and 45. To prevent a bale from toppling forwardly as it is being elevated, a pressure bar 52 is located above conveyor 40 and coextensive therewith. Bar 52 is carried at its lower forward end on framing 53 and on structure 54 midway between its ends. The presser bar is suspended on pivoted links 55 and 56 for movement toward and away from the conveyor 40. A spring 58 is interconnected between the link 55 and the pressure bar 52 to normally urge the bar to the position shown in FIG. 1. However, when a bale B emerges and engages the presser bar 52, the bar is shifted away from the conveyor 40 and spring 58 is extended. When the bale is discharged, the pressure bar is able to return to the position shown in FIG. 1 responsive to the retraction of spring 58. Link 55 has a square end 59 engageable with a channel portion of presser bar 52 to stop the inward movement of the bar when it reaches substantially the position shown in FIG. 1. Thus, the presser bar provides a yieldable, downwardly biasing force on the top surface of each bale as it is conveyed upwardly and rearwardly along the elevator and tumbling of the bales is prevented.

Figure 4:
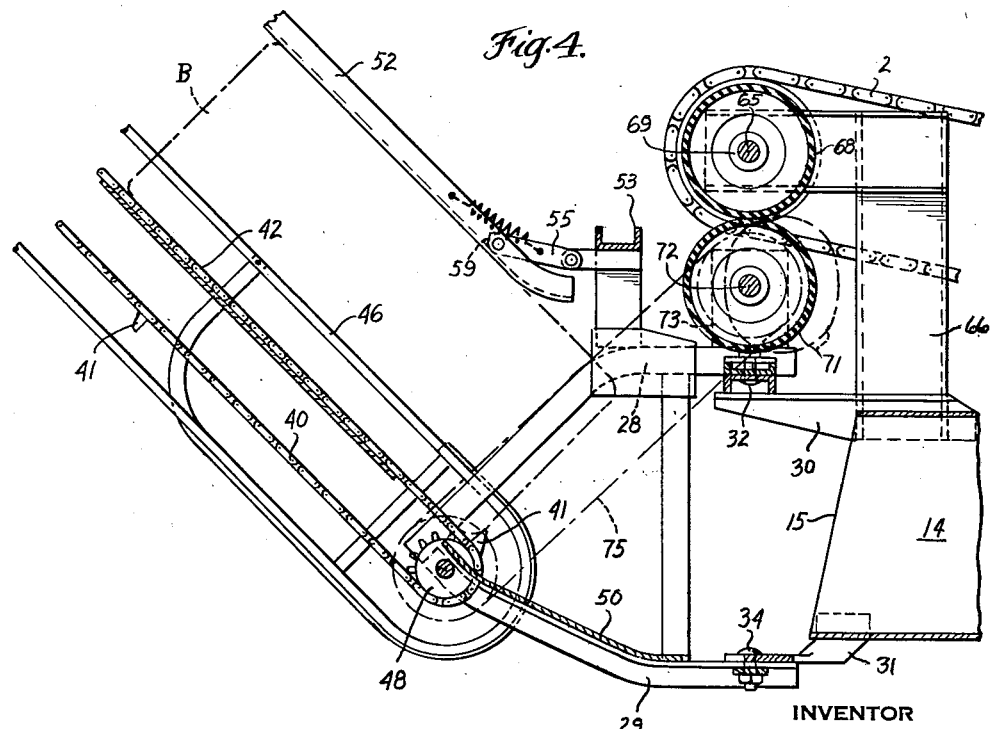
FIG. 4 is a side elevation of FIG. 3.

For driving the bale elevator 25, the baler 10 is provided with an output power shaft 60 which carries a drive sprocket 61. Extending around sprocket 61 is an endless chain 62 which extends around and transmits power to a driven sprocket 64 carried on a transversely extending horizontal shaft 65. Shaft 65 extends in a fixed axial position relative to the bale case 14 being journalled on support 66 extending upwardly from the bale case. As shown in FIGS. 1 and 4 shaft 65 is substantially vertically spaced from the top of the bale case 14. Mounted on shaft 65 is an upper friction wheel 68 in the form of a pneumatic tire having a hub 69 surrounding shaft 65 and slidable axially thereon. Set screws 70 are provided to lock wheel 68 in adjusted position.

When viewed as shown in FIG. 1, shaft 65 and friction wheel 68 rotate in a clockwise direction. Such rotation is transmitted to a lower friction wheel 71, also in the form of a pneumatic tire, the periphery of which is in firm engagement with the periphery of wheel 68. Thus, when the wheel 68 is rotated such rotation is transmitted to wheel 71 and wheel 71 is rotated in a counterclockwise direction, FIG. 1. Wheel 71 is carried on a horizontal shaft 72 journalled on support 73 affixed to upper frame rotates in a fixed position relative to bale case 14, wheel member 28 of elevator frame 26. Thus, while wheel 68 rotates in a fixed position relative to bale case 14, wheel 71 rotates about the axis of the shaft 72 which is shiftable relative to the bale case responsive to lateral swinging of the elevator structure. Although not shown, wheel 71 is axially adjustable along shaft 72 the same as wheel 68 is adjustable on shaft 65, set screws or other locking means being employed.

Shaft 72 projects laterally of the bale case side (FIG. 3) and is provided with a drive sprocket 74 around which a drive chain 75 extends. The chain 75 is connected to a sprocket 76 affixed to the shaft 78 on which is carried lower sprocket 48 of elevator conveyor 40. Thus, power is transmitted from the baler 10 to the elevator 25 through the friction wheels 68 and 71.

The two friction wheels are pressed tightly together to provide a drive from one wheel to the other. However, the wheels are free to pivot relative to each other about a vertical axis since they merely have frictional peripheral engagement. As shown in FIGS. 2 and 3, the wheels 68 and 71 are laterally offset relative to the vertical axis about which elevator 25 is laterally swingable and provided by pivots 32 and 34. Thus, when the elevator swings laterally, driven wheel 71 swings with it about the pivot axis of the thrower and it is shifted relative to wheel 68. At a certain predetermined point of lateral movement, the peripheral engagement of the two wheels ceases. At this time, the drive to the elevator 25 ceases. Thus, when the elevator swings laterally responsive to a change in the direction of travel of the baler 10 and the upper end of the elevator swings beyond a side wall of the trailing wagon 16, the drive to the elevator will stop and the conveying of bales will cease until the turn has been completed and the wagon returns toward a position behind the baler. The drive to elevator 25 is terminated automatically and without requiring control from the operator. Further, no clutching or declutching is employed in a conventional sense, the disengagement of the drive resulting merely from the movement of the wheel 71 away from the wheel 68 as a result of the offset relation of the two wheels relative to the elevator pivot axis.

The frictional engagement of the two wheels provides a safety means in the transmission of power to the elevator. If the elevator becomes overloaded, the drive wheel 68 may slip relative to the wheel 71 and result in a reduction or elimination of the power to the elevator until the overloaded situation is corrected. The drive is simple and inexpensive and the operator may adjust the location of the wheels to achieve a power disconnection at a desired time. Merely by loosening the set screws 71 and axially sliding the wheels 68 and 71 to desired positions, the operator can set the point at which the wheels will become disengaged and thus establish the particular angular point at which the elevator will stop operating when the baler is making a turn. This accommodates for different types and widths of wagons being used to receive the bales. There is no danger of the bales being deposited over the side of the wagon when a sharp turn is being made.

Since the elevator derives its power from the baler, no separate power means is required. The wheels 68 and 71 are less expensive than bevel gears or other means and provide operating characteristics which are unobtainable when gears are used.

The structure described provides a relatively simple and inexpensive arrangement for receiving bales and conveying them to a trailing wagon. The bales merely tumble from the upper end of the conveyor and become piled at random in the wagon. If desired, stacking may be employed. The disconnection of the drive to the elevator when a turn is being made insures that the conveying of bales will stop if the bailer then becomes angularly disposed relative to the wagon beyond a certain point, specifically when the discharge end of the elevator projects beyond a side of the wagon.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. An elevator for receiving succesive bales discharged from the bale case of a field hay baler and for conveying the bales for deposit in a wagon trailing behind the baler comprising a frame, means pivotally mounting said frame on the bale case for lateral swinging movement about a vertical axis and to each side of a normal neutral position, link means on said frame and connectable to the wagon for swinging the frame responsive to changes in the direction of travel of the baler, conveying means on said frame having a lower receiving end adjacent the bale case and a higher discharge end above the wagon, a pair of friction wheels offset relative to said vertical axis and normally having peripheral engagement with each other, one of said wheels being a drive wheel supported on the baler and rotatable about a fixed axis, the other of said wheels being a driven wheel supported on said frame and rotatable about an axis fixed relative to the frame and shiftable relative to the bale case responsive to lateral swinging of the elevator frame, said other wheel being drivingly disengaged from said one wheel when shifted beyond a given amount, power means rotating said drive wheel, and means connecting said driven wheel to said conveying means.

2. An elevator as recited in claim 1 wherein said driven wheel is located beneath said drive wheel.

3. An elevator as recited in claim 1 wherein said drive and driven wheels are mounted for adjustment along axes of the shafts on which they are mounted to selectively establish the points on opposite sides of said neutral position of said frame where the driven wheel will move out of driving engagement with the drive wheel.

4. An elevator as recited in claim 1 wherein said drive and driven wheels comprise pneumatic tires having peripheral treads firmly engaging each other whereby when the drive wheel is rotated the driven wheel is rotated.

5. An elevator for receiving successive bales discharged from the bale case of a field hay baler and for conveying the bales for deposit in a wagon trailing behind the baler comprising a frame extending upwardly and rearwardly from the bale case, means pivotally mounting said frame on the bale case for lateral swinging movement about a vertical axis, link means on said frame and connectable to the wagon for swinging the frame responsive to changes in the direction of travel of the baler, elongated endless conveying means on said frame and having a lower receiving end adjacent the bale case and a higher discharge end above the wagon, and power means on said baler and connected to said conveying means to drive the conveying means, said power means including a pair of rotatable drive wheels normally in engagement with each other and located offset relative to said vertical axis, one of said drive wheels being carried in a fixed location relative to said frame, said other drive wheel being moved out of engagement with said one drive wheel responsive to lateral swinging of said frame beyond a given amount.

References Cited in the file of this patent

UNITED STATES PATENTS

| | | |
|---|---|---|
| 1,306,597 | Krogen | June 10, 1919 |
| 2,650,723 | Saumer | Sept. 1, 1953 |